US006682574B2

(12) United States Patent
Carter et al.

(10) Patent No.: US 6,682,574 B2
(45) Date of Patent: Jan. 27, 2004

(54) BINDER FOR ABRASIVE ARTICLES, ABRASIVE ARTICLES INCLUDING THE SAME AND METHOD OF MAKING SAME

(75) Inventors: Christopher J. Carter, Nuneaton (GB); Richard J. Darwood, Market Harborough (GB); Roy Stubbs, Nuneaton (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/242,009

(22) Filed: Sep. 12, 2002

(65) Prior Publication Data

US 2003/0079415 A1 May 1, 2003

(30) Foreign Application Priority Data

Sep. 13, 2001  (GB) .............................................. 0122153

(51) Int. Cl.$^7$ .............................. B24D 3/00; B24D 3/02; B24D 3/28
(52) U.S. Cl. ............................ 51/298; 51/307; 51/308; 51/309; 51/295
(58) Field of Search ......................... 51/298, 307, 308, 51/309, 295

(56) References Cited

U.S. PATENT DOCUMENTS

| 1,910,444 A | 5/1933 | Nicholson |
| 3,041,156 A | 6/1962 | Rowse et al. |
| 4,314,827 A | 2/1982 | Leitheiser et al. |
| 4,396,403 A | 8/1983 | Ibrahim |
| 4,609,581 A | 9/1986 | Ott |
| 4,623,364 A | 11/1986 | Cottringer et al. |
| 4,744,802 A | 5/1988 | Schwabel |
| 4,751,138 A | 6/1988 | Tumey et al. |
| 4,770,671 A | 9/1988 | Monroe et al. |
| 4,828,583 A | 5/1989 | Oxman et al. |
| 4,881,951 A | 11/1989 | Wood et al. |
| 4,997,461 A | 3/1991 | Markhoff-Matheny et al. |
| 5,009,675 A | 4/1991 | Kunz et al. |
| 5,011,508 A | 4/1991 | Wald et al. |
| 5,042,991 A | 8/1991 | Kunz et al. |
| 5,085,671 A | 2/1992 | Martin et al. |
| 5,213,591 A | 5/1993 | Celikkaya et al. |
| 5,254,194 A | 10/1993 | Ott et al. |
| 5,505,747 A | 4/1996 | Chesley et al. |
| 5,611,825 A | 3/1997 | Engen et al. |
| 5,704,952 A | 1/1998 | Law et al. |

FOREIGN PATENT DOCUMENTS

| GB | 419812 | 11/1934 |
| WO | WO 94/06839 | 3/1994 |
| WO | WO 96/09141 | 3/1996 |

OTHER PUBLICATIONS

Ebewele, Robert O., "Polyamine–Modified Urea–Formaldehyde Resins. I. Synthesis, Structure, and Properties," *Journal of Applied Polymer Science*, vol. 47, pp. 2997–3012 (1991), published by John Wiley & Sons, Inc, (no month).

*Primary Examiner*—Michael Marcheschi
(74) *Attorney, Agent, or Firm*—Gregory D. Allen

(57) ABSTRACT

A binder for abrasive products, coated abrasive articles and a method of making the same comprising a urea formaldehyde resin precursor cured in the presence of a sole catalyst which consists essentially of at least one salt of an acid with a diamine of the formula $H_2N-R-NH_2$ wherein R is an alkylene group of 3 to 10 carbon atoms, and the acid is selected from the group consisting of hydrochloric, citric, nitric, sulphuric, acetic, phosphoric and combinations thereof.

40 Claims, No Drawings

BINDER FOR ABRASIVE ARTICLES, ABRASIVE ARTICLES INCLUDING THE SAME AND METHOD OF MAKING SAME

RELATED APPLICATION

This application claims priority from British Application Number 0122153.0, filed Sep. 13, 2001.

FIELD OF INVENTION

This invention relates to a catalyzed urea formaldehyde binder for use in abrasive articles, a method of making the binder, abrasive articles made therewith and in particular to coated abrasive articles and to a method of making coated abrasive articles.

DISCUSSION OF RELATED ART

Coated abrasive articles generally contain an abrasive material, typically in the form of abrasive grains, bonded to a backing via of one or more adhesive layers. Such articles usually take the form of sheets, discs, belts, bands, and the like, which can be adapted to be mounted on pads, wheels or drums. Abrasive articles can be used for sanding, grinding or polishing various surfaces of, for example, steel and other metals, wood, wood-like laminates, plastic, fiberglass, leather or ceramics.

The backings used in coated abrasive articles are typically made of paper, polymeric materials, cloth, vulcanized fiber or combinations of these materials. A common type of bond system includes a make coat, a size coat, and optionally a supersize coat. The make coat typically includes a tough, resilient polymer binder that adheres the abrasive particles to the backing. The size coat, which also typically includes a tough resilient polymer binder that may be the same as or different from the make coat binder, is applied over the make coat and abrasive particles to further reinforce the particles. The supersize coat, including one or more antiloading ingredients or perhaps grinding aids, may then be applied over the size coat if desired.

In a typical manufacturing process, a coated abrasive article is made in a continuous web form and then converted into a desired construction, such as a sheet, disc, belt, or the like. Binders for the purpose of adhering the abrasive granules to the backing include the traditional phenolic resins, urea-formaldehyde resins, hide glue, varnish, epoxy resins, and polyurethane resins, or more recently a class of radiation cured crosslinked acrylate binders; see, e.g., in U.S. Pat. No. 4,751,138 (Tumey, et al.) and U.S. Pat. No. 4,828,583 (Oxman, et al.).

High performance coated abrasive articles have traditionally used phenolic size resins. Such resin systems suffer from the disadvantage that they require high temperatures for a prolonged time for optimum curing. This prevents the use of such resins with some polymeric backings either because they will not withstand the cure temperature or because the high cure temperature may result in dimensional instability of the coated sheet, e.g., curling upon cooling to ambient temperature. Additional disadvantages are that phenolic resins tend to be more expensive and have more undesirable emissions compared to urea-formaldehyde resin systems.

Urea formaldehyde (UF) was first patented for use as an adhesive for coated abrasives by 3M Company ("3M") in the mid 1930's (Great Britain Pat. No. 419,812). Since that time a number of different coated abrasive products have been made with acid catalyzed UF resins. Today, the two most common catalysts used with UF resins are aluminum chloride ($AlCl_3$) and ammonium chloride ($NH_4Cl$).

Urea-aldehyde resins have enjoyed great success in coated abrasives. However, the need to reduce the use of solvents and unreacted reactants which contribute to release of volatile organic hydrocarbons (VOC) in the process of making coated abrasives and the need to increase the quality of the abrasives while maintaining or increasing their level of performance are challenging the industry.

When aluminum chloride is used as the catalyst, a higher temperature than normal must be used to cure the urea-aldehyde resin, which in turn leads to curling of edges of the coated abrasive. Also, the gel time, pot life and peak exotherm temperatures are all dependent on the concentration of the aluminum chloride. Consequently, there is a trade-off between aluminum chloride concentration and curing conditions, especially with low free-aldehyde UF resins.

Unlike aluminum chloride catalysis, the gel time, pot life and peak exotherm temperatures are all independent of the ammonium chloride concentration. However, the activity (ability of the catalyst to catalyze the reaction) of ammonium chloride is dependent on the free formaldehyde concentration in the binder precursor composition. With low free aldehyde resins, the ammonium chloride does not activate the condensation reaction very readily until a sufficient temperature is reached. However, as mentioned above, increased temperature tends to curl the edges of the coated abrasive and does not render performance improvements.

U.S. Pat. No. 5,611,825 (Engen, et al.) reports coated abrasives comprising a backing coated on at least one major surface thereof with an abrasive coating comprising a binder and abrasive particles. The binder is comprised of a solidified urea-aldehyde resin, the solidified urea-aldehyde resin being derived from a binder precursor comprising a urea-aldehyde resin having a low free aldehyde content and a co-catalyst. The co-catalyst is a catalyst consisting essentially of a Lewis acid, preferably aluminium chloride or an organic amine salt or an ammonium salt, preferably ammonium chloride. Preferred linear organic amine salts are those selected from the group of compounds having the general formula:

wherein X and Y are halide atoms that may be the same or different and n is an integer ranging from about 3 to about 10. An example of such a linear organic amine salt found useful is the dichloride salt of hexamethylene diamine, obtained by the acidification of an aqueous solution of hexamethylene diamine with hydrochloric acid (HCl). One branched chain organic amine salt found useful is that known under the trade designation "DYTEK-A," available from E. I. duPont de Nemours & Co., Wilmington, Del., which is commonly known as 2-methyl-pentamethylene diamine.

Although urea-formaldehyde resins have been used as make, size and supersize resins in coated abrasives they are generally not able to match the performance of coated abrasive made with phenol-formaldehyde resins.

SUMMARY OF THE INVENTION

It has now been found that certain urea formaldehyde resin systems can provide comparable performance to phenol formaldehyde resins when used in the production of coated abrasives. According to the present invention there is provided a coated abrasive article comprising a backing having at least one major surface, a plurality of abrasive grains bonded to at least a portion of the one major surface of the backing by at least one binder, wherein the binder comprises an urea formaldehyde resin precursor cured in the presence of a sole catalyst which consists essentially of at least one salt of an acid with a diamine of the formula:

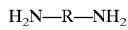

H₂N—R—NH₂ in which R is an alkylene group of 3 to 10 carbon atoms, wherein the acid is selected from the group consisting of hydrochloric, citric, nitric, sulphuric, acetic, phosphoric and combinations thereof.

In a further aspect, the invention provides a method of making a coated abrasive which comprises coating a major surface of a backing with a plurality of abrasive grains and a binder comprising a urea formaldehyde resin precursor solution and a solution of a sole catalyst which consists essentially of at least one salt of an acid with a diamine of the formula:

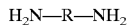

H₂N—R—NH₂ in which R is an alkylene group of 3 to 10 carbon atoms, wherein the acid is selected from the group consisting of hydrochloric, citric, nitric, sulphuric, acetic, phosphoric and combinations thereof, and curing the urea formaldehyde resin precursor. Curing is typically accomplished by heating at a temperature of at least 60° C., preferably at a temperature in the range of about 75° C. to 140° C., or a temperature in the range of 80° C. to 90° C. for 40 minutes or less, or at a temperature in the range of 115° C. to 125° C. for less than 10 minutes.

In a further aspect, the invention provides a binder which is useful in abrasive products comprising urea formaldehyde precursor resin cured in the presence of a sole catalyst which consists essentially of at least one salt of an acid with a diamine of the formula:

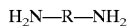

H₂N—R—NH₂ in which R is an alkylene group of 3 to 10 carbon atoms, wherein the acid is selected from the group consisting of hydrochloric, citric, nitric, sulphuric, acetic, phosphoric and combinations thereof.

In a further aspect, the invention provides a method of making a binder comprising mixing components comprising an aqueous solution of a urea-formaldehyde resin precursor; and a sufficient quantity of an aqueous solution of a sole catalyst to initiate cross-linking of said urea-formaldehyde resin precursor of a catalyst consisting essentially of at least one salt of an acid with a diamine of the formula:

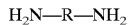

H₂N—R—NH₂ in which R is an alkylene group of 3 to 10 carbon atoms, wherein the acid is selected from the group consisting of hydrochloric, citric, nitric, sulphuric, acetic, phosphoric and combinations thereof to provide a mixture; and heating said mixture to provide said binder.

As used herein, the term "sole catalyst" means only one catalyst is employed, that being the diamine salt catalyst as defined above.

The term "catalyst" refers to the diamine salt defined above and its ability to initiate polymerization of urea-formaldehyde resin precursor to provide a cured urea-formaldehyde resin which is cross-linked.

It has been found that the use of particular catalysts which are salts of a lower alkaline diamine with an acid in combination with urea formaldehyde resin precursors provide a binder system suitable for use in coated abrasives which may provide comparable and sometimes superior physical properties to the use of phenolic resins systems while allowing low cure temperatures and shorter cure times. The cost of the urea formaldehyde binder system is significantly less than the cost of a phenolic resin system and the urea formaldehyde resin may have in excess of 90% less emissions than a phenolic resin system.

The catalyst used in the invention is derived from an alkaline diamine containing from 3 to 10 carbon atoms. Preferably, the diamine is 1,2 hexamethylene diamine or octadiamine. The acid is selected from hydrochloric, citric, nitric, sulphuric, acetic and phosphoric acids. Phosphoric acid is preferred. The preferred catalyst is 1,6, hexamethylene diamine phosphate.

DETAILED DESCRIPTION

The catalysts that are useful to initiate the cure of urea formaldehyde resin precursor in accordance with the present invention are formed by reacting the diamine with an acid to form a salt. The diamines are typically reacted to give a salt solution with a pH in the range of about 10.0 to about 10.5 for the HCl salt and about 6 for the phosphate and other acid salts. The optimum pH depends upon the acid used and is generally about 6, except for the chloride salt. The urea formaldehyde resin precursor, typically available as an aqueous solution, is mixed with an aqueous solution of the diamine salt catalyst and heated to cause the resin precursor to cure.

The catalysts are typically used in an amount just sufficient to initiate the reaction to cause urea formaldehyde precursor to polymerize to form the urea formaldehyde resin, although additional amounts may also be useful. That amount of diamine catalyst on a dry weight basis is typically in the range of about 1 to about 25% by weight, preferably about 2 to about 10% by weight, most preferably about 3 to about 5% by weight, based upon the total dry weight of the urea formaldehyde resin precursor plus diamine catalyst.

It has been surprisingly found that these diamine salt catalysts in combination with urea formaldehyde resin precursors provide improved cured urea formaldehyde resin binders compared with those produced by the use of the corresponding triamines or hexamine catalyst systems.

The above defined diamine salts are the sole catalysts employed in the urea formaldehyde binders of the invention. The diamine salts are latent catalysts and do not catalyze the curing of the resin below temperatures of about 60° C. Thus, the pot life of the resin binder system at ambient temperature is longer which is particularly beneficial in the manufacturing process of the coated abrasives. This is in contrast to a co-catalyst system comprising a Lewis acid, such as aluminium chloride, and an amine salt which begins to cure the resin system at ambient temperature and has a limited pot life.

The term "urea formaldehyde resin precursor" refers to compounds which may include monomers or oligomers which are curable in the presence of an appropriate catalyst to provide fully cured urea formaldehyde resins which are solid polymeric materials that are cross-linked. Urea-formaldehyde resin precursors compositions useful in the present invention may be prepared by the reaction of urea with formaldehyde. The molar ratio of formaldehyde to urea ("F/U ratio") of the resin ranges from about 1.4:1.0 to about 1.6:1.0. Urea-formaldehyde resins having low, i.e. less than 1%, free formaldehyde are preferred. The urea formaldehyde resin precursor aqueous solution generally has a viscosity in the range 600 to 1600 cps (0.6 to 1.6 Pascal seconds) measured at 60% by weight solids in aqueous medium using a BROOKFIELD LV viscometer with a number 1 spindle at ambient temperature (e.g., 20° C.). A preferred urea formaldehyde resin has a viscosity of about 860 cps (0.86 Pascal seconds) at ambient temperature.

Examples of commercially available urea-formaldehyde resin precursor aqueous solutions include those having the trade designations "AL3029R," commercially available from the Borden Chemical Co., Westchester, Ill., USA, and "CBU UF," commercially available from Dynochem Limited, Mold, U.K.

The binder preferably generally additionally comprises at least one of an acid filler or neutral filler. Preferred fillers are of the platelet type having a particle size of less than 10 micrometers. Preferred fillers include mica and clays (e.g., kaolin and silane-treated kaolin). Calcium silicate, magnesium calcium silicate may also be used. Specific materials suitable for use as fillers include those under the trade designations: SX400 mica, VANSIL EW20 (Wollastonite, calcium silicate), NYTAL 200, 400 and 7700 (magnesium calcium silicate, Microfine Minerals Ltd., Derby, U.K.); POLARITE 102A (silane treated calcined kaolin), POLESTAR 200R (calcined kaolin), kaolin grade E-silane treated, Supreme China Clay (Imerys Co., Paris, France).

The filler is generally employed in an amount from about 5 to about 50% by weight of the dry weight of urea formaldehyde binder (that being the dry weight of the urea formaldehyde precursor plus the dry weight of the diamine catalyst), preferably from about 15 to about 30%, more preferably about 25% by weight of the dry weight of the urea formaldehyde binder. The presence of the filler contributes towards the flexural modulus of the cured binder system.

The binder preferably comprises a wetting agent to assist in deflocculating and dispersing the filler. The particular selection of wetting agent will depend upon the filler present in the binder formulation. Suitable wetting agents include esters of polyethylene glycol, ammonium salt of polyacrylic acid and a methacrylamide functional amine adduct of neopentyl-diallyl-oxy-tridioctyl pyro-phosphato titanate.

Suitable materials for use as wetting agents for the fillers include those available under the trade designations: DISPEX A40 (ammonium salt of polyacrylic acid, Harcros Chemicals, Inc., Kansas City, Kans.), IRGASTAT 33 (ester of polyethylene glycol, Ciba Specialty Chemicals, Basel, Switzerland), LICA 38J (methacrylamide functional amine adduct of neopentyl-diallyl-oxy tri-dioctyl pyro-phosphato titanate, Kenrich Petrochemicals Inc., Bayonne, N.J.).

The wetting agent is generally used in the range about 0.1 to about 1.0% by weight based on the total weight of filler, although additional amounts may also be useful.

The binder formulations used in the invention may preferably additionally comprise a toughening agent. This is preferably a polymer latex selected from vinyl acetate, vinyl chloride, ethylene, styrene butyl acrylate and vinyl ester of versatic acid, polymers and copolymers.

The glass transition temperature (Tg) of the polymers used as toughening agents is typically in the range 0° C. to 50° C. Typical useful polymers include VINAMUL, e.g., VINAMUL 3303 (vinyl acetate-ethylene, Tg 0° C.), VINAMUL 3405 (a blend of the monomers vinyl acetate, vinyl chloride and ethylene with nonylphenol ethoxylate surfactant as a dispersant), VINAMUL 3479 (vinyl acetate-vinyl chloride-ethylene, Tg 30° C.), VINAMUL 69223 (vinyl acetate-vinyl ester of versatic acid, Tg 22° C.), VINAMUL 3252 (vinyl acetate-ethylene, Tg 3° C.), VINAMUL 3253 (vinyl acetate-ethylene, Tg 7° C.), VINAMUL 31259 (vinyl acetate-ethylene), VINAMUL 3171 (vinyl acetate-ethylene, Tg 4° C.), VINAMUL 43627 (vinyl acetate-butyl acrylate), and VINAMUL 7139 (Styrene-acrylate, Tg 50° C.), commercially available from Vinamul Polymers, Bridgewater, N.J.

The toughening agent is generally present in an amount in the range about 1 to about 50% by weight based on the weight of the urea formaldehyde resin (i.e., the resin precursor plus catalyst).

The binder formulation may additionally comprise other adjuvants, e.g., a defoamer and other conventional adjuvants typically used in coated abrasive binder formulations.

The urea formaldehyde binder may be present as a make coat, size coat and/or a supersize coat. Preferably, the binder is used as a size coat. The binder may be coated by any of the conventional techniques known in the art. The binder is generally cured at a temperature in the range of 75 to 140° C. Low temperature curing can be effected at a temperature of 80 to 90° C. for 20 to 40 minutes. Alternatively, higher temperatures may be employed (e.g., 115 to 125° C.) for shorter cure time periods (e.g., less than 10 minutes). Resin slabs are typically pre-dried at lower temperatures (e.g., 50° C.) prior to curing.

When used as a supersize coat, the binder formulation may comprise antiloading agents, fillers, anti-static agents, lubricants, grinding aids, etc. Examples of such additives include salts and soaps of fatty acids such as lauric acid, myristic acid, palmitic acid, stearic acid, arachic acid and behenic acid, stearate salts, particularly calcium, zinc and lithium stearate, fluorinated compounds, e.g., a fluorochemical compound selected from compounds comprising a fluorinated aliphatic group attached to a polar group or moiety and compounds having a molecular weight of at least about 750 and comprising a non-fluorinated polymeric backbone having a plurality of pendant fluorinated aliphatic groups comprising the higher of (a) a minimum of three C—F bonds, or (b) in which 25% of the C—H bonds have been replaced by C—F bonds such that the fluorochemical compounds comprises at least 15% by weight of fluorine, potassium fluoroborate, sodium fluorosilicate, potassium fluoride, iron sulfide, potassium phosphate, molybdenum disulfide and calcium hydrogen phosphate and the antiloading component disclosed in U.S. Pat. No. 5,704,952 (Law, et al.) incorporated herein by reference.

The backing substrate used in the coated abrasive articles may be selected from any of a wide range of materials including paper, polymeric materials, cloth, and combinations thereof.

The abrasive articles can contain 100% of a single abrasive grain mineral composition. Alternatively, the abrasive article may comprise a blend or mixture of different abrasive grain mineral compositions. The mineral may be coated from 1% to 99% blends, preferably 50 to 95%, to form either open or closed coat construction. Useful conventional abrasive grains include fused aluminum oxide, heat treated aluminum oxide, white fused aluminum oxide, silica, silicon carbide, titanium diboride, boron carbide, tungsten carbide, titanium carbide, diamond, cubic boron nitride, garnet, fused alumina zirconia, sol gel abrasive grains and the like. Examples of sol gel abrasive grains can be found in U.S. Pat. No. 4,314,827 (Leitheiser, et al.); U.S. Pat. No. 4,623,364 (Cottringer, et al.); U.S. Pat. No. 4,744,802 (Schwabel); U.S. Pat. No. 4,770,671 (Monroe, et al.) and U.S. Pat. No. 4,881,951 (Wood, et al.), all of which are incorporated herein by reference. The diamond and cubic boron nitride abrasive grains may be monocrystalline or polycrystalline. The particle size of these conventional abrasive grains can range from about 0.01 to 1500 micrometers, typically between 1 to 1000 micrometers. The abrasive grains may also contain an organic or inorganic coating. Such surface coatings are described, for example, in U.S. Pat. No. 5,011,508 (Wald, et al.); U.S. Pat. No. 1,910,444 (Nicholson); U.S. Pat. No. 3,041,156 (Rowse, et al.); U.S. Pat. No. 5,009,675 (Kunz, et al.); U.S. Pat. No. 4,997,461 (Markhoff-Metheny); U.S. Pat. No. 5,213,591 (Celikkaya, et al.); U.S. Pat. No. 5,085,671 (Martin, et al.); and U.S. Pat. No. 5,042,991 (Kunz, et al.) all of which are incorporated herein by reference.

In one embodiment a pressure sensitive adhesive is coated onto the back side of the coated abrasive such that the resulting coated abrasive can be secured to a back up pad. In another embodiment the coated abrasive may contain a hook and loop type attachment system to secure the coated abrasive to the back up pad. The loop fabric may be on the back side of the coated abrasive with hooks on the back up pad. Alternatively, the hooks may be on the back side of the coated abrasive with the loops on the back up pad. This hook and loop type attachment system is further described in U.S. Pat. No. 4,609,581 (Ott); U.S. Pat. No. 5,254,194 (Ott, et al.); and U.S. Pat. No. 5,505,747 (Barry, et al.), all of which are incorporated herein by reference.

EXAMPLES

Embodiments of this invention are further illustrated by the following examples, but the particular materials and amounts thereof recited in these examples, as well as other conditions and details, should not be construed to unduly limit this invention. All parts and percentages are by weight unless otherwise indicated.

In the Examples the following materials were used:

| | |
|---|---|
| CBU UF | A urea formaldehyde resin precursor commercially available from Dynochem Limited, Mold, Flintshire, U.K., supplied as a 67–70% solids aqueous solution having a viscosity of 685 to 1600 cps (0.685 to 1.6 Pascal seconds) depending upon the molecular weight of the resin (typically about 790 cps, 0.79 Pascal seconds). |
| SX400 | Mica commercially available from Microfine Minerals Limited, Derby, U.K. |
| POLARITE 102A | Silane treated calcined kaolin commercially available from Imerys Co., Paris, France. |
| V4305 | Vinyl acetate-vinyl chloride-ethylene latex commercially available from National Starch & Chemical Co., Bridgewater, NJ. |
| V3479 | Vinyl acetate-vinyl chloride-ethylene latex commercially available from National Starch & Chemical Co. |
| Kaolin Grade E | Silane treated kaolin commercially available from Imerys Co., Paris, France. |
| LICA 38J | Methacrylamide functional amine adduct of neopentyl-diallyl-oxy-tri-dioctyl pyro-phosphato titanate commercially available from Kenrich Petrochemicals Inc., Bayonne, NJ. |
| IRGASTAT 33 | Ester of polyethylene glycol commercially available from Ciba Specialty Chemicals, Basel, Switzerland. |
| 1512M | A defoamer commercially available from Hercules Inc., Wilmington, DE. |

Examples 1A–1E

Examples 1A–1E, respectively, show urea formaldehyde resin precursors cured with diamine-based catalysts with different acid salts.

In Example 1A a diamine phosphate catalyst solution was made by mixing under reflux 47.5 g of 60% weight solution of 1,6-hexamethylene diamine (0.25 mole) in water with 46.6 g of 85% weight solution of phosphoric acid (0.48 mole) and 200 g of water. The resulting mixture generated heat, indicating an exothermic reaction, and the mixture was cooled during manufacture and before use. The resultant solution contained 23% by weight diamine phosphate catalyst.

The following procedure was used to prepare the Examples:
  1. Mix the urea formaldehyde resin precursor aqueous solution and the wetting agent, if used, to provide a resin pre-mix smooth paste.
  2. High-shear mix the filler into the resin pre-mix smooth paste.
  3. Mix in the latex containing the toughening agent polymer, if used.
  4. Mix in the defoamer, if used.
  5. Mix in the diamine salt catalyst solution.

Examples 1B–1E show the preparation of other catalysts using the same diamine, i.e., 1,6-hexamethylene diamine, reacted with other acids to produce diamine salt catalyst solutions. These were prepared in an analogous manner as described above for Example 1A using the same molar equivalents.

The resulting catalysts were mixed with the CBU UF urea formaldehyde resin precursor aqueous solution to provide a mixture which was cast to form a 40 mm×20 mm×1 mm slab and cured in an oven for 30 minutes at 50° C., followed by 60 minutes at 75° C., followed by a seven day aging at room temperature.

Example 1A

| Component | Wet Wt. % | Solids (g) | Dry Wt. % |
|---|---|---|---|
| Urea formaldehyde resin precursor solution (CBU UF) | 65.00 | 42.25 | 64.29 |
| Hexamethylene diamine phosphate salt solution | 15.00 | 3.47 | 5.28[1] |
| Mica (SX400) | 20.00 | 20.00 | 30.43 |

[1]The amount of catalyst on a dry weight basis based on the total dry weight of the resin (i.e., the urea formaldehyde resin precursor plus dry weight of catalyst) is 7.59%.

Example 1B

| Component | Wet Wt. % | Solids (g) | Dry Wt. % |
|---|---|---|---|
| Urea formaldehyde resin precursor solution (CBU UF) | 574.96 | 373.72 | 66.64 |
| Hexamethylene diamine sulphate salt solution | 51.12 | 25.83 | 4.61[1] |
| Vinyl acetate-vinyl chloride-ethylene latex (V4305) | 14.48 | 7.24 | 1.29 |
| Mica (SX400) | 130.72 | 130.72 | 23.31 |
| Methacrylamide functional amine adduct of neopentyl-diallyl-oxy-tri-dioctyl pyro-phosphato titanate wetting agent (LICA 38J) | 0.30 | 0.30 | 0.05 |
| Wetting agent (IRGASTAT 33) | 7.36 | 7.36 | 1.31 |
| Defoamer (1512M) | 4.48 | 4.48 | 0.80 |
| Orange Pigment | 16.40 | 11.15 | 1.99 |

[1]6.46% by weight of the resin.

Example 1C

| Component | Wet Wt. % | Solids (g) | Dry Wt. % |
|---|---|---|---|
| Urea formaldehyde resin precursor solution (CBU UF) | 574.96 | 373.72 | 67.70 |
| Hexamethylene diamine acetate salt solution | 51.12 | 17.04 | 3.09[1] |
| Vinyl acetate-vinyl chloride-ethylene latex (V4305) | 14.48 | 7.24 | 1.31 |
| Mica (SX400) | 130.72 | 130.72 | 23.68 |
| Wetting agent (LICA 38J) | 0.30 | 0.30 | 0.05 |
| Wetting agent (IRGASTAT 33) | 7.36 | 7.36 | 1.33 |
| Defoamer (1512M) | 4.48 | 4.48 | 0.81 |
| Orange Pigment | 16.40 | 11.15 | 2.02 |

[1] 4.36% by weight of the resin.

Example 1D

| Component | Wet Wt. % | Solids (g) | Dry Wt. % |
|---|---|---|---|
| Urea formaldehyde resin precursor solution (CBU UF) | 574.96 | 373.72 | 67.56 |
| Hexamethylene diamine nitrate salt solution | 51.12 | 18.23 | 3.29[1] |
| Vinyl acetate-vinyl chloride-ethylene latex (V4305) | 14.48 | 7.24 | 1.31 |
| Mica (SX400) | 130.72 | 130.72 | 23.63 |
| Wetting agent (LICA 38J) | 0.30 | 0.30 | 0.05 |
| Wetting agent (IRGASTAT 33) | 7.36 | 7.36 | 1.33 |
| Defoamer (1512M) | 4.48 | 4.48 | 0.81 |
| Orange Pigment | 16.40 | 11.15 | 2.02 |

[1] 4.65% by weight of the resin.

Example 1E

| Example No. | Catalyst | Flexural Modulus (MPa) | Toughness (MPa) |
|---|---|---|---|
| 1A | diamine phosphate | 10830 | 0.08 |
| 1B | diamine sulphate | 10960 | 0.0795 |
| 1C | diamine acetate | 9127 | 0.0111 |
| 1D | diamine nitrate | 9542 | 0.0724 |
| 1E | diamine citrate | 8635 | 0.0645 |

The flexural modulus and toughness of the slabs were measured at room temperature by 3 point bend using a flexural modulus and toughness testing device commercially available from Instron Corp., Canton, Mass. under the trade designation INSTRON 4301. The summary of the results is reported in the following Table.

| Component | Wet Wt. % | Solids (g) | Dry Wt. % |
|---|---|---|---|
| Urea formaldehyde resin precursor solution (CBU UF) | 574.96 | 373.72 | 66.94 |
| Hexamethylene diamine citrate salt solution | 51.12 | 23.30 | 4.17[1] |
| Vinyl acetate-vinyl chloride-ethylene latex (V4305) | 14.48 | 7.24 | 1.30 |
| Mica (SX400) | 130.72 | 130.72 | 23.41 |
| Wetting agent (LICA 38J) | 0.30 | 0.30 | 0.05 |
| Wetting agent (IRGASTAT 33) | 7.36 | 7.36 | 1.32 |
| Defoamer (1512M) | 4.48 | 4.48 | 0.80 |
| Orange Pigment | 16.40 | 11.15 | 2.00 |

[1] 5.87% by weight of the resin.

The surfaces of the diamine-sulphate and nitrate diamine-catalyzed slabs were not as smooth as the diamine phosphate-catalyzed slabs.

Examples 2 to 8

The following formulations were prepared and tested in accordance with Example 1.

The formulations were cast into slabs as in Example 1. The resin formulations were cured as described in Example 1.

Example 2

| Component | Wet Wt. % | Solids (g) | Dry Wt. % |
|---|---|---|---|
| Urea formaldehyde resin precursor solution (CBU UF) | 65.00 | 42.25 | 55.92 |
| 4.7 molar hexamethylene diamine hydrochloride solution | 15.00 | 13.31 | 17.62[1] |
| Mica (SX400) | 20.00 | 20.0 | 26.47 |

[1] 23.96% by weight of the resin.
Flexural modulus = 673 MPa
Toughness = 0.045 MPa

Example 3

| Component | Wet Wt. % | Solids (g) | Dry Wt. % |
|---|---|---|---|
| Urea formaldehyde resin precursor solution (CBU UF) | 69.78 | 45.38 | 79.40 |
| Vinyl acetate-vinyl chloride-ethylene latex (V4305) | 19.77 | 10.00 | 17.51 |
| 4.7 molar hexamethylene diamine hydrochloride solution | 1.99 | 1.77 | 3.09[1] |
| Water | 8.46 | | |

[1] 3.5% by weight of the resin.
Flexural modulus = 466 MPa
Toughness = 0.191 MPa

Example 4

| Component | Wet Wt. % | Solids (g) | Dry Wt. % |
|---|---|---|---|
| Urea formaldehyde resin precursor solution (CBU UF) | 80.41 | 52.27 | 82.69 |
| Vinyl acetate-vinyl chloride-ethylene latex (V4305) | 1.53 | 0.76 | 1.21 |
| 4.7 molar hexamethylene diamine phosphate solution | 10.23 | 2.36 | 3.73[1] |
| Kaolin grade E | 6.59 | 6.59 | 10.43 |
| Wetting agent (IRGASTAT 33) | 0.82 | 0.82 | 1.30 |
| Defoamer (1512M) | 0.41 | 0.41 | 0.65 |

[1] 4.32% by weight of the resin.
Flexural modulus = 722 MPa
Toughness = 0.13 MPa

Example 5

| Component | Wet Wt. % | Solids (g) | Dry Wt. % |
|---|---|---|---|
| Urea formaldehyde resin precursor solution (CBU UF) | 62.48 | 40.61 | 66.75 |
| Vinyl acetate-vinyl chloride-ethylene latex (V4305) | 17.71 | 8.86 | 14.55 |
| 4.7 molar hexamethylene diamine hydrochloride solution | 1.78 | 1.58 | 2.60[1] |
| Silane treated calcined kaolin (POLARITE 102A) | 9.62 | 9.62 | 15.81 |
| Defoamer (1512M) | 0.18 | 0.18 | 0.30 |
| Water | 8.22 | | |

[1] 3.74% by weight of the resin.
Flexural modulus = 484 MPa
Toughness = 0.11 MPa

Example 6

| Component | Wet Wt. % | Solids (g) | Dry Wt. % |
|---|---|---|---|
| Urea formaldehyde resin precursor solution (CBU UF) | 76.56 | 49.76 | 76.79 |
| Vinyl acetate-vinyl chloride-ethylene latex (V4305) | 15.01 | 7.51 | 11.58 |
| 4.7 molar hexamethylene diamine hydrochloride solution | 7.93 | 7.03 | 10.86[1] |
| Mica (SX400) | 0.30 | 0.30 | 0.46 |
| Defoamer (1512M) | 0.20 | 0.20 | 0.31 |

[1] 12.39% by weight of the resin.
Flexural modulus = 330 MPa
Toughness = 0.06 MPa

Example 7

| Component | Wet Wt. % | Solids (g) | Dry Wt. % |
|---|---|---|---|
| Urea formaldehyde resin precursor solution (CBU UF) (858 cps) | 73.41 | 46.73 | 69.79 |
| Vinyl acetate-vinyl chloride-ethylene latex (V3479) | 1.85 | 0.91 | 1.35 |
| Hexamethylene diamine phosphate solution (mix of 23.53 g of a 60% solution of 1,6 hexamethylene diamine in water and 23.22 g of an 85% solution of phosphoric acid and 100 g of water) | 6.50 | 1.47 | 2.19[1] |
| Mica (SX400) | 16.69 | 16.34 | 24.40 |
| Methacrylamide functional amine adduct of neopentyl-diallyl-oxy-tri-dioctyl pyrophosphato titanate wetting agent (LICA 38J) | 0.04 | 0.04 | 0.06 |
| Wetting agent (IRGASTAT 33) | 0.94 | 0.92 | 1.37 |
| Defoamer (1512M) | 0.57 | 0.56 | 0.84 |

[1] 3.05% by weight of the resin.
Flexural modulus = 2293 MPa
Toughness = 0.08 MPa

Example 8

| Component | Wet Wt. % | Solids (g) | Dry Wt. % |
|---|---|---|---|
| Urea formaldehyde resin precursor solution (CBU UF) | 77.31 | 45.77 | 75.36 |
| Vinyl acetate-vinyl chloride-ethylene latex (V4305) | 1.94 | 0.89 | 1.46 |
| Mica filler (SX400) | 12.25 | 11.16 | 18.38 |
| Defoamer (1512M) | 0.60 | 0.55 | 0.91 |
| Wetting agent (IRGASTAT 33) | 0.99 | 0.90 | 1.48 |
| Hexamethylene diamine phosphate solution (pH 5.8 to 6.1) | 6.87 | 2.38 | 2.16[1] |
| Wetting agent (LICA 38J) | 0.02 | 0.02 | 0.04 |

[1] 3.06% by weight of the resin.

The flexural modulus and toughness of slabs made from this mix according to the techniques of Example 1 was compared with slabs made from the phenolic resin mix used in the size layer of 775L STIKIT™ abrasive disc commercially available from 3M United Kingdom plc.

| | Urea Formaldehyde Mix | Phenolic Resin Mix |
|---|---|---|
| Flexural modulus (MPa) | 1067 | 800 |
| Toughness (MPa) | 0.127 | 0.076 |

The urea formaldehyde mix was used as a size coat in place of the phenolic resin system on a P180 775L STIKIT™ disc. The cutting performance of each disc was closely matched both in terms of cutting rate and cumulative cut.

Example 9

The following formulation was prepared:

| Component | Wet Wt. % | Solids (g) | Dry Wt. % |
|---|---|---|---|
| Methacrylamide functional amine adduct of neopentyl-diallyl-oxy-tri-dioctyl pyrophosphato titanate (LICA 38J) | 0.04 | 0.04 | 0.05 |
| Urea formaldehyde resin precursor solution (CBU UF) | 71.87 | 46.72 | 68.35 |
| Vinyl acetate-vinyl chloride-ethylene latex (V4305) | 1.81 | 0.91 | 1.32 |
| Mica (SX400) | 16.34 | 16.34 | 23.91 |
| Defoamer (1512M) | 0.56 | 0.56 | 0.82 |
| Wetting agent (IRGASTAT 33) | 0.92 | 0.92 | 1.35 |
| Hexamethylene diamine phosphate solution | 6.39 | 1.47 | 2.16[1] |
| Orange pigment | 2.05 | 1.39 | 2.04 |

[1] 3.06% by weight of the resin.

The diamine phosphate was a mix of 23.75 g of a 60% solution of 1,6 hexamethylene diamine in water and 23.22 g of an 85% solution of phosphoric acid and 100 g of water. These components were mixed under reflux, causing an exotherm, heating the solution. The solution was cooled during preparation.

The mix procedure was as follows:
1. Mix the CBU urea formaldehyde resin precursor solution with the wetting agent (LICA 38J) and filler to provide a smooth paste.
2. Mix in the SX400 mica filler.
3. Mix in the Orange pigment.

4. Mix in the latex (V4305) containing the toughening agent polymer.
5. Mix in defoamer (1512M).
6. Mix in the wetting agent (IRGASTAT 33).
7. Mix in the hexamethylene diamine phosphate solution The mixture was used as a size coat on coated abrasive web which was converted into 15 cm diameter P80 HOO-KIT™ discs (HOOKIT™ is a trade mark of 3M Company). The mixture was used in place of the conventional phenol formaldehyde size coat, normally used on the commercially available product (3M 775L). The disc exhibited closely matched cutting performance to the commercially available disc.

Example 10

This Example demonstrates use of the urea formaldehyde resin in a supersize layer.

The urea formaldehyde binder used was the same one described in Example 9 with the exception that the orange pigment was not added. The binder was mixed with a calcium stearate dispersion 1097A commercially available from eChem Ltd., Leeds, U.K., in the following weight ratios:

| Binder | Stearate |
|--------|----------|
| 5 | 95 |
| 10 | 90 |
| 20 | 80 |
| 30 | 70 |
| 45 | 55 |
| 70 | 30 |

The supersize was coated over an abrasive sheet equivalent to that which is commercially available under the trade designation 3M618, without its supersize layer. Coated abrasive identified as 3M618 is available from 3M United Kingdom plc and it comprises a paper backing, a urea formaldehyde make coating, a urea formaldehyde size coating and SiC abrasive particles. The supersize coatings were dried and cured for 5 minutes at 105° C.

Samples were evaluated by hand sanding on medium density fiber board (MDF) panels coated with (a) a water based lacquer or (b) a waxed polyester and compared against the commercial product 3M 618.

The water based lacquer was that available under the trade designation "WATER BASED LACQUER SEMI-MATT" from Granyte Coatings, Salford, U.K. The wax polyester was that available under the trade designation "SAYER-LACK PH6355" from Arch Coatings, Knottingley, U.K.

Each panel was sanded for 50 strokes (about 20×4 cm$^2$). The abrasive sheet was supported on a rubber block (5×2.5 cm$^2$) but was used by hand. The cut was measured in grams.

Anti-loading and cut performance of the samples of the invention was similar to that of the 3M618 coated abrasive sheet for the test on water based lacquer for 55% and higher stearate levels.

Anti-loading and cut performance of the samples of the invention was similar to that of the 3M618 coated abrasive sheet for the test on waxed polyester lacquer for 70% and higher stearate levels.

Various modifications and alterations of this invention will become apparent to those skilled in the art without departing from the scope and spirit of this invention, and it should be understood that this invention is not to be unduly limited to the illustrative embodiments set forth herein.

We claim:

1. A coated abrasive article comprising a backing having at least one major surface, a plurality of abrasive grains bonded to at least a portion of the one major surface of the backing by at least one binder, wherein the binder comprises a urea formaldehyde resin precursor cured in the presence of a sole catalyst which consists essentially of at least one salt of an acid with a diamine of the formula:

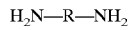

in which R is an alkylene group of 3 to 10 carbon atoms, wherein the acid is selected from the group consisting of hydrochloric, citric, nitric, sulphuric, acetic, phosphoric and combinations thereof.

2. A coated abrasive article as claimed in claim 1 in which the acid comprises phosphoric acid.

3. A coated abrasive article as claimed in claim 1 in which R comprises hexamethylene.

4. A coated abrasive article as claimed in claim 1 in which the catalyst is present in an amount of from about 1 to about 25% by weight, based on the total dry weight of the urea formaldehyde resin precursor plus catalyst.

5. A coated abrasive article as claimed in claim 1 in which the catalyst is present in an amount of about 2 to about 10% by weight, based on the total dry weight of the urea formaldehyde resin precursor plus catalyst.

6. A coated abrasive article as claimed in claim 1 in which the binder further comprises at least one of an acid filler or neutral filler.

7. A coated abrasive article as claimed in claim 6 in which the filler is of a platelet shape having a particle size of less than 10 micrometers.

8. A coated abrasive article as claimed in claim 6 in which the filler comprises at least one of mica or clay.

9. A coated abrasive article as claimed in claim 6 in which the filler is present in an amount of from about 5 to about 50% by weight based on the dry weight of the urea formaldehyde resin precursor plus catalyst.

10. A coated abrasive article as claimed in claim 9 in which the filler is present in an amount of about 15% to about 30% by weight based on the dry weight of the urea formaldehyde resin precursor plus catalyst.

11. A coated abrasive article as claimed in claim 1 in which the binder further comprises a wetting agent.

12. A coated abrasive article as claimed in claim 11 in which the wetting agent is a member selected from a group consisting of esters of polyethylene glycol, ammonium salt of polyacrylic acid, a methacrylamide functional amine adduct of neopentyl-dially-oxy-tridioctyl pyro-phosphato titanate and combinations thereof.

13. A coated abrasive article as claimed in claim 6 in which the binder further comprises a wetting agent in an amount of from about 0.1 to about 1% by weight of the filler.

14. A coated abrasive article as claimed in claim 1, in which the binder further comprises a toughening agent.

15. A coated abrasive article as claimed in claim 14 in which the toughening agent is a polymer selected from the group consisting of vinyl acetate, vinyl chloride, ethylene, styrene butyl acrylate and vinyl ester of versatic acid, polymers and copolymers, and combinations thereof.

16. A coated abrasive article as claimed in claim 14 in which the toughening agent is a polymer selected from the group consisting of vinyl acetate-ethylene, vinyl acetate-vinyl chloride-ethylene, vinyl acetate-butyl acrylate, styrene-acrylate copolymers and combinations thereof.

17. A coated abrasive article as claimed in claim 16 in which the polymer is a vinyl acetate-vinyl chloride-ethylene copolymer.

18. A coated abrasive article as claimed in claim 14 in which the toughening agent is present in an amount of from about 1 to about 50% by weight based on the total dry weight of the urea formaldehyde resin precursor plus catalyst.

19. A coated abrasive article as claimed in claim 1 in which the binder further comprises a defoamer.

20. A coated abrasive article as claimed in claim 1 in which the urea formaldehyde resin precursor prior to curing has a viscosity in the range 600 to 1600 cps measured at 60% by weight solids in aqueous medium using a Brookfield spinning disc viscometer with a number 1 spindle at ambient temperature.

21. A coated abrasive article as claimed in claim 20 in which the urea formaldehyde resin precursor prior to curing has a viscosity of about 860 cps measured at 60% solids in aqueous medium.

22. A coated abrasive article as claimed in claim 1 in which the binder is present at least as a make coat.

23. A coated abrasive article as claimed in claim 1 in which the binder is present at least as a size coat.

24. A coated abrasive article as claimed in claim 1 in which the binder is present at least as a supersize coat.

25. A coated abrasive article as claimed in claim 1 in which the backing is a member selected from the group consisting of paper, polymeric materials, cloth materials and combinations thereof.

26. A method of making a coated abrasive article which comprises coating a major surface of a backing with a plurality of abrasive grains and a binder comprising a urea formaldehyde resin precursor solution and a solution of a sole catalyst which consists essentially of at least one salt of an acid with a diamine of the formula:

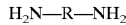

$$H_2N-R-NH_2$$

in which R is an alkylene group of 3 to 10 carbon atoms, wherein the acid is selected from the group consisting of hydrochloric, citric, nitric, sulphuric, acetic, phosphoric and combinations thereof, and curing the urea formaldehyde resin precursor.

27. The method of making a coated abrasive as claimed in claim 26 in which R comprises hexamethylene.

28. The method of making a coated abrasive product as claimed in claim 26 in which the catalyst is present in an amount of from about 1 to about 25 percent by weight, based upon the total weight of the urea formaldehyde resin precursor plus catalyst.

29. The method of making a coated abrasive product as claimed in claim 26 in which the catalyst is present in an amount of about 2 to about 10 percent by weight, based upon the total weight of the urea formaldehyde resin precursor plus catalyst.

30. The method of making a coated abrasive product according to claim 26 wherein the binder further comprises at least one of an acid filler or a neutral filler.

31. A method of making a coated abrasive product as claimed in claim 26 in which the binder further comprises a wetting agent.

32. A method of making a coated abrasive as claimed in claim 26 in which the binder further comprises a toughening agent.

33. A method of making a coated abrasive product according to claim 26 in which the binder further comprises a defoamer.

34. A method of making a coated abrasive as claimed in claim 26 in which the binder is applied at least as a make coat.

35. A method of making a coated abrasive as claimed in claim 26 in which the binder is applied at least as a size coat.

36. A method of making a coated abrasive as claimed in claim 26 in which the binder is applied at least as a supersize coat.

37. A method of making a coated abrasive as claimed in claim 26 in which the backing is a member selected from the group consisting of paper, polymeric materials, cloth, nonwoven materials and combinations thereof.

38. A method of making a coated abrasive as claimed in claim 26 in which the urea formaldehyde resin precursor is cured at a temperature of from 75 to 140° C.

39. A method of making a coated abrasive as claimed in claim 26 in which the urea formaldehyde resin precursor is cured at a temperature of 80 to 90° C. for 20 to 40 minutes.

40. A method of making a coated abrasive as claimed in claim 26 in which the urea formaldehyde resin precursor is cured at a temperature of 115 to 125° C. for less than 10 minutes.

* * * * *

UNITED STATES PATENT AND TRADEMARK OFFICE
CERTIFICATE OF CORRECTION

PATENT NO.    : 6,682,574 B2
DATED         : January 27, 2004
INVENTOR(S)   : Carter, Christopher J.

It is certified that error appears in the above-identified patent and that said Letters Patent is hereby corrected as shown below:

Column 2,
Line 40, "aluminium" should be -- aluminum --
Line 45, "$(X^{31})$" should be -- $(X^-)$ --
Line 61, "abrasive" should be -- abrasives --

Column 4,
Line 40, "aluminium" should be -- aluminum --

Column 7,
Line 10, "(Markhoff-Metheny)" should be -- (Markhoff-Matheny) --

Column 9,
Lines 35-66, should read as follows:

Example 1E

| Component | Wet Wt. % | Solids (g) | Dry Wt. % |
|---|---|---|---|
| Urea formaldehyde resin precursor solution (CBU UF) | 574.96 | 373.72 | 66.94 |
| Hexamethylene diamine citrate salt solution | 51.12 | 23.30 | 4.17[1] |
| Vinyl acetate-vinyl chloride-ethylene latex (V4305) | 14.48 | 7.24 | 1.30 |
| Mica (SX400) | 130.72 | 130.72 | 23.41 |
| Wetting agent (LICA 38J) | 0.30 | 0.30 | 0.05 |
| Wetting agent (IRGASTAT 33) | 7.36 | 7.36 | 1.32 |
| Defoamer (1512M) | 4.48 | 4.48 | 0.80 |
| Orange Pigment | 16.40 | 11.15 | 2.00 |

[1] 5.87% by weight of the resin.

The flexural modulus and toughness of the slabs were measured at room temperature by 3 point bend using a flexural modulus and toughness testing device commercially available from Instron Corp., Canton, MA, under the trade designation INSTRON 4301. The summary of the results is reported in the following Table.

| Example No. | Catalyst | Flexural Modulus (MPa) | Toughness (MPa) |
|---|---|---|---|
| 1A | diamine phosphate | 10830 | 0.08 |
| 1B | diamine sulphate | 10960 | 0.0795 |
| 1C | diamine acetate | 9127 | 0.0111 |
| 1D | diamine nitrate | 9542 | 0.0724 |
| 1E | diamine citrate | 8635 | 0.0645 |

UNITED STATES PATENT AND TRADEMARK OFFICE
CERTIFICATE OF CORRECTION

PATENT NO. : 6,682,574 B2
DATED : January 27, 2004
INVENTOR(S) : Carter, Christopher J.

It is certified that error appears in the above-identified patent and that said Letters Patent is hereby corrected as shown below:

<u>Column 14,</u>
Line 51, "dially" should be -- diallyl --.

Signed and Sealed this

Thirty-first Day of August, 2004

JON W. DUDAS
*Director of the United States Patent and Trademark Office*